(No Model.)
S. SPEED.
THILL COUPLING.
No. 601,175. Patented Mar. 22, 1898.
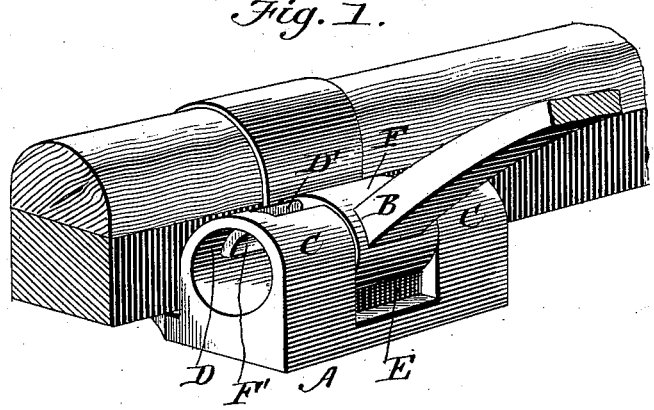
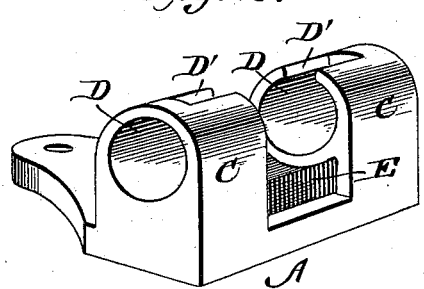
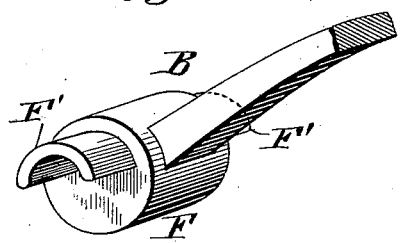
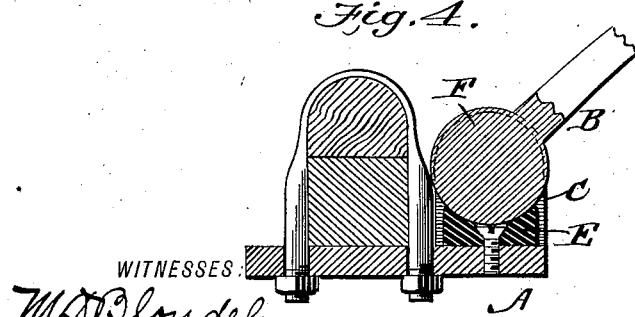
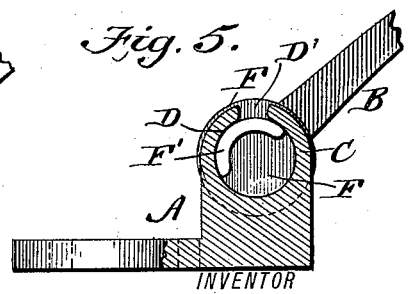
WITNESSES:
M. D. Blondel
P. B. Turpin
INVENTOR
Silas Speed.
BY Munn & Co.
ATTORNEYS.

UNITED STATES PATENT OFFICE.

SILAS SPEED, OF BARRON, WISCONSIN.

THILL-COUPLING.

SPECIFICATION forming part of Letters Patent No. 601,175, dated March 22, 1898.

Application filed April 9, 1897. Serial No. 631,353. (No model.)

*To all whom it may concern:*

Be it known that I, SILAS SPEED, of Barron, in the county of Barron and State of Wisconsin, have invented a new and useful Improvement in Thill-Couplings, of which the following is a specification.

My invention is an improved thill-coupling; and it consists in certain novel constructions and combinations of parts, as will be hereinafter described, and pointed out in the claims.

In the drawings, Figure 1 is a perspective view of the thill-coupling. Figs. 2 and 3 are detail perspective views, and Figs. 4 and 5 are cross-sections of the coupling.
The coupling is composed of the clip-section A and the thill-section B. The clip-section A is formed with the bearings C C, spaced apart and having internal curved seats D for the end plates of the thill-section. These bearings C are preferably ring-like, as shown, and are provided with slots D', which lead from their inner or adjacent ends toward the outer ends of the ring-like bearings and terminate short of such ends, as shown. These ring-like bearings are on opposite sides of an intermediate connecting portion having a socket in which is supported a cushion or spring E, which is arranged in a line diametrically opposite the slats D and bears against the intermediate portion of the thill-section. I call this section A the "clip-section," and it may be carried by the lower plate of the clip, as shown, or upon the loop portion, which fits upon the axle, if so desired.
The thill-section B is usually a part of the thill-iron, as shown, and is formed with the intermediate portion F, made cam shape or eccentric, as shown, and the end plates F', projecting from the central portion and engaging the seats of the bearings of the clip-section. These end plates are flattened transversely and are arranged to be inserted through the slots D' into the bearing-rings and when in coupled position in said rings to overlap the slots and to be held firmly against the curved seats D of the bearings C by the pressure against the cam or eccentric intermediate portion F of the cushion or spring E. This cushion may be a rubber block, as shown, or other suitable construction and efficiently serves the purpose of holding the sections A B tightly together and preventing any rattling of the coupling.

To detach the thills, it is only necessary to lift the same until the front ends of the plates F' can be withdrawn through the slots, such lifting of the thills also adjusting the cam portion of the thill-section so it bears with but slight pressure on the cushion. To apply the thills, such operation is reversed, and as the thills are brought down to position for use the cam or eccentric bears strongly against the cushion or spring.

Having thus described my invention, what I claim as new, and desire to secure by Letters Patent, is—

1. A thill-coupling comprising a thill-section provided at its opposite sides with projecting bearing-lugs curved in cross-section, and the clip-section having at its ends bearing-seats for the said curved bearing-lugs, having slots for the insertion of said lugs, and provided between said seats with a cushion arranged in a line diametrically opposite the slots leading to the bearing-seats whereby the cushion will press the lugs within and against the seats on opposite sides of and overlapping the slots as shown and described.

2. A thill-coupling composed of the clip-section having ring-like bearings and an intermediate connecting portion, such bearings being provided with slots, and the connecting portion having approximately diametrically opposite the slots of the bearing-rings, a seat for the cushion, the cushion on said seat, and the thill-section having an intermediate portion bearing on the cushion, and end lugs projecting into the bearing-rings and curved to coincide therewith and fit within the rings on opposite sides of said slots and arranged to overlap the slots of the bearing-rings, substantially as described.

3. In a thill-coupling the combination with the clip-section having end ring-bearings provided with entering slots, and the intermediate cushion, and the thill-section having at its ends projecting lugs coinciding with and fitting in the bearing-rings and arranged to overlap the slots thereof when the thill-section is in position for use, and the cushion arranged to press the thill-section to set its lugs tightly in the bearing-rings overlapping the slots substantially as shown and described.

SILAS SPEED.

Witnesses:
FRED B. KINSLEY,
PERRY L. SPEED.